(12) United States Patent
Kaminsky et al.

(10) Patent No.: US 7,644,993 B2
(45) Date of Patent: Jan. 12, 2010

(54) IN SITU CO-DEVELOPMENT OF OIL SHALE WITH MINERAL RECOVERY

(75) Inventors: Robert D. Kaminsky, Houston, TX (US); William A. Symington, Houston, TX (US); Jesse D. Yeakel, Missouri City, TX (US); Michele M. Thomas, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 238 days.

(21) Appl. No.: 11/726,651

(22) Filed: Mar. 22, 2007

(65) Prior Publication Data

US 2007/0246994 A1 Oct. 25, 2007

Related U.S. Application Data

(60) Provisional application No. 60/793,841, filed on Apr. 21, 2006.

(51) Int. Cl.
*E21B 43/241* (2006.01)
(52) U.S. Cl. .......................................... 299/5; 166/302
(58) Field of Classification Search ..................... 299/5; 166/302, 303
See application file for complete search history.

(56) References Cited

U.S. PATENT DOCUMENTS

| | | | |
|---|---|---|---|
| 2,732,195 A | 1/1956 | Ljungstrom | 262/3 |
| 3,468,376 A | 9/1969 | Slusser et al. | 166/272.2 |
| 3,502,372 A | 3/1970 | Prats | 299/5 |
| 3,572,838 A | 3/1971 | Templeton | 299/4 |
| 3,700,280 A | 10/1972 | Papadopoulos et al. | 299/5 |
| 3,739,851 A | 6/1973 | Beard | 166/254 |
| 3,759,328 A | 9/1973 | Ueber et al. | 166/303 |
| 3,759,574 A | 9/1973 | Beard | 299/4 |
| 4,065,183 A | 12/1977 | Hill et al. | 229/4 |
| 4,140,180 A | 2/1979 | Bridges et al. | 166/248 |
| 4,369,842 A | 1/1983 | Cha | 166/251 |

(Continued)

FOREIGN PATENT DOCUMENTS

WO   WO 2005/010320   2/2005

(Continued)

OTHER PUBLICATIONS

Hardy, M., et al. (2003) "Solution Mining of Nahcolite at American Soda's Yankee Gulch Project," *Mining Engineering*, Oct. 2003, pp. 23-31.

(Continued)

*Primary Examiner*—John Kreck

(57) ABSTRACT

A method of producing hydrocarbon fluids from a subsurface organic-rich rock formation, for example an oil shale formation, in which the oil shale formation contains water-soluble minerals, for example nahcolite, is provided. In one embodiment, the method includes the step of heating the organic-rich rock formation in situ. Optionally, this heating step may be performed prior to any substantial removal of water-soluble minerals from the organic-rich rock formation. In accordance with the method, the heating of the organic-rich rock formation both pyrolyzes at least a portion of the formation hydrocarbons, for example kerogen, to create hydrocarbon fluids, and converts at least a portion of the water-soluble minerals, for example, converts nahcolite to soda ash. Thereafter, the hydrocarbon fluids are produced from the formation.

29 Claims, 4 Drawing Sheets

U.S. PATENT DOCUMENTS

| | | | |
|---|---|---|---|
| 4,375,302 A | 3/1983 | Kalmar | 299/4 |
| 4,815,790 A | 3/1989 | Rosar et al. | 299/4 |
| 4,886,118 A | 12/1989 | Van Meurs et al. | 166/245 |
| 6,581,684 B2 | 6/2003 | Wellington et al. | 166/245 |
| 6,609,761 B1 | 8/2003 | Ramey et al. | 299/5 |
| 6,742,588 B2 | 6/2004 | Wellington et al. | 166/245 |
| 6,782,947 B2 | 8/2004 | de Rouffignac et al. | 166/245 |
| 6,880,633 B2 | 4/2005 | Wellington et al. | 166/245 |
| 6,932,155 B2 | 8/2005 | Vinegar et al. | 166/245 |
| 6,948,562 B2 | 9/2005 | Wellington et al. | 166/272.1 |
| 6,964,300 B2 | 11/2005 | Vinegar et al. | 166/245 |
| 6,969,123 B2 | 11/2005 | Vinegar et al. | 299/3 |
| 6,997,518 B2 | 2/2006 | Vinegar et al. | 299/5 |
| 7,011,154 B2 | 3/2006 | Maher et al. | 166/245 |
| 7,066,254 B2 | 6/2006 | Vinegar et al. | 166/245 |
| 7,073,578 B2 | 7/2006 | Vinegar et al. | 166/245 |
| 7,100,994 B2 | 9/2006 | Vinegar et al. | 299/7 |
| 7,104,319 B2 | 9/2006 | Vinegar et al. | 166/245 |
| 7,121,342 B2 | 10/2006 | Vinegar et al. | 166/302 |
| 2003/0131994 A1* | 7/2003 | Vinegar et al. | 166/256 |
| 2004/0211557 A1 | 10/2004 | Cole et al. | 166/242.1 |
| 2005/0269077 A1 | 12/2005 | Sandberg | 166/249 |
| 2007/0045265 A1 | 3/2007 | McKinzie, II | 219/207 |
| 2007/0095537 A1 | 5/2007 | Vinegar | 166/302 |
| 2007/0131415 A1 | 6/2007 | Vinegar et al. | 166/245 |

FOREIGN PATENT DOCUMENTS

| | | |
|---|---|---|
| WO | WO 2005/045192 | 5/2005 |
| WO | WO 2007/050479 | 5/2007 |

OTHER PUBLICATIONS

Day, R. L., (1998) "Solution Mining of Colorado Nahcolite, Wyoming State Geological Survey Public Information Circular 40," *Proceedings of the First International Soda Ash Conference*, V.II (Rock Springs, Wyoming, Jun. 10-12) pp. 121-130.

Dunks, G. et al. (1983) "Electrochemical Studies of Molten Sodium Carbonate," *Inorg. Chem.*, 22, pp. 2168-2177.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fox, J. P, (1980) "Water-related Impacts of In-Situ Oil Shale Processing," *California Univ., Berkeley, Lawrence Berkeley Lab*, Chapters 6-7.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Motzfeldt, K. (1954) "The Thermal Decomposition of Sodium Carbonate by the Effusion Method," *Jrnl. Phys. Chem.*, v. LIX, pp. 139-147.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.

Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.

Peters, G., (1990) "The Beneficiation of Oil Shale by the Solution Mining of Nahcolite," *23rd Colorado School of Mines Oil Shale Symposium* (Golden, CO) pp. 142-151.

Prats, M., et al. (1977) "Soluble-Salt Processes for In-Situ Recovery of Hydrocarbons from Oil Shale," *Journal of Petrol. Technol.*, pp. 1078-1088.

Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).

Salamonsson, G. (1951) "The Ljungstrom In Situ Method for Shale-Oil Recovery," *2nd Oil Shale and Cannel Coal Conference*, 2, Glasgow, Scotland, Inst. of Petrol., London, pp. 260-280.

Templeton, C. C. (1978) "Pressure-Temperature Relationship for Decomposition of Sodium Bicarbonate from 200 to 600° F," *J. of Chem. and Eng. Data*, 23(1), pp. 7-8.

Thomas, A. M. (1963) "Thermal Decomposition of Sodium Carbonate Solutions," *J. of Chem. and Eng. Data*, 8(1), pp. 51-54.

"Encyclopedia of Chemical Technology" (4th ed.), *Alkali and Chlorine Products*, pp. 1025-1039 (1998).

* cited by examiner

IN SITU CO-DEVELOPMENT OF OIL SHALE WITH MINERAL RECOVERY

CROSS-REFERENCE TO RELATED APPLICATION

This application claims the benefit of U.S. Provisional Patent Application No. 60/793,841 filed on Apr. 21, 2006.

BACKGROUND OF THE INVENTION

1. Field of the Invention

The present invention relates to the field of hydrocarbon recovery. More specifically, the present invention relates to the production of hydrocarbon fluids and the recovery of water-soluble minerals, such as nahcolite and/or soda ash, from an organic-rich rock formation, such as an oil shale formation.

2. Background of the Invention

Certain geological formations are known to contain an organic matter known as "kerogen." Kerogen is a solid, carbonaceous material. When kerogen is imbedded in mineral formations, the mixture may be referred to as oil shale. This is true whether or not the mineral is, in fact, technically shale, that is, a rock formed from compacted clay. Upon heating, kerogen produces oil, gas and some water. Oil shale formations are typically found at relatively shallow depths (<about 3,000 feet) in various areas world-wide and of the United States, including for example Wyoming, Colorado and Utah. Many such formations are known to have extremely limited permeability.

Kerogen may be converted to mobile hydrocarbons by heating the oil shale to temperatures generally in excess of 270° C. (518° F.). The rate of conversion increases sharply with increasing temperature. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting has also been conducted in other countries such as Australia, Brazil, China, Estonia, France, Russia, South Africa, Spain, and Sweden. However, the practice has been mostly discontinued in recent years because it proved to be uneconomical or because of environmental constraints on spent shale disposal. (T. F. Yen, and G. V. Chilingarian, "Oil Shale," Amsterdam, Elsevier, p. 292). The entire disclosure of which is incorporated herein by reference. Further, surface retorting requires mining of the oil shale, which limits application to shallow formations.

Research on oil shale production was generally carried out through the 1900's. In 1947, U.S. Pat. No. 2,732,195 issued to Ljungstrom, the entire disclosure of which is incorporated herein by reference. That patent, entitled "Method of Treating Oil Shale and Recovery of Oil and Other Mineral Products Therefrom," proposed the application of heat at high temperatures to the oil shale formation in situ. Ljungstrom coined the phrase "heat supply channels" to describe bore holes drilled into the formation. The bore holes received an electrical heat conductor which transferred heat to the surrounding oil shale. Thus, the heat supply channels served as heat injection wells.

The heat injection wells were equipped with electrical heating elements. The elements, in turn, were surrounded by sand or cement or other heat-conductive material. Each heat injection well transmitted heat into the surrounding oil shale while preventing any inflow of fluid. Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full-scale plant was developed that operated from 1944 into the 1950's. (G. Salamonsson, "The Ljungstrom In Situ Method for Shale-Oil Recovery," $2^{nd}$ Oil Shale and Cannel Coal Conference, v. 2, Glasgow, Scotland, Institute of Petroleum, London, p. 260-280 (1951)). The entire disclosure of which is incorporated herein by reference.

Since 1947, various patents have been issued offering modifications and improvements to Ljungstrom's ideas. For instance, U.S. Pat. No. 3,468,376 issued to Slusser, et al. in 1969 entitled "Thermal Conversion of Oil Shale into Recoverable Hydrocarbons", the entire disclosure of which is incorporated herein by reference. The '376 Slusser, et al. patent suggested a process for circulating a heated pyrolyzing fluid through a flow channel. Abrasive particles were added to the circulating fluid to erode a layer of pyrolyzed oil shale being formed adjacent to the flow channel. This provided a channel for the flow of converted kerogen.

It was recognized in the Slusser, et al. patent that "[t]here are two mechanisms involved in the transport of heat through the oil shale." First, heat is transferred through the solid mass of oil shale by conduction. Second, heat is transferred by convection through fluid flow of pyrolyzed kerogen within the oil shale." Slusser, et al. noted that typically the transfer of heat by conduction is a relatively slow process due to the oil shale being an inherently poor conductor of heat. If significant permeability does exist or is created, convective heat transfer by fluids traveling through fine channels in the oil shale can contribute to the overall rate of heat transfer.

Various means for heating the rock matrix and imbedded kerogen have been proposed. U.S. Pat. No. 4,140,180, assigned to the ITT Research Institute in Chicago, Ill. and issued in 1979, suggested the application of in situ heat using radio frequency (RF) electrical energy. The entire disclosure of which is incorporated herein by reference. In doing so, the '180 patent listed and described other methodologies for applying pyrolyzing heat using electrical energy. The patent stated that, as of that time, "there is no . . . acceptable economical way to extract the hydrocarbon constituents."

Techniques for in situ retorting of oil shale were developed and pilot tested with the Green River oil shale in the United States in the 1970's and 1980's. In situ processing offers advantages because it reduces costs associated with material handling and disposal of spent shale. In a number of the in situ pilots, the oil shale was first rubblized. Thereafter, combustion was carried out by air injection. A rubble bed with substantially uniform fragment size and substantially uniform distribution of void volume was a key success factor in combustion sweep efficiency. Fragment size was of the order of several inches.

Nevertheless, attempts to economically extract shale oil continued. In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). The '118 patent proposed controlling the rate of heat conduction within the rock surrounding each heat injection well to provide a uniform heat front. The process was limited to formations having a specified grade and thickness.

Additional history behind shale oil retorting and recovery can be found in patent publication WO 2005/010320 entitled "Methods of Treating a Subterranean Formation to Convert Organic Matter into Producible Hydrocarbons," and in WO 2005/045192 entitled "Hydrocarbon Recovery from Impermeable Oil Shales." The Background and technical disclosures of these two patent publications are incorporated herein by reference.

The WO 2005/010320 process involves the use of electrically conductive fractures to heat the oil shale. A heat source is constructed using wellbores and then hydraulically fracturing the oil shale. The fractures are filled with an electrically conductive material which forms a heating element. Calcined petroleum coke is a suitable conductant material. Preferably, the fractures are created in a vertical orientation along longitudinal, horizontal planes formed by horizontal wellbores. Electricity is conducted through the conductive fractures from the heel to the toe of each well. The electrical circuit is completed by an additional horizontal well that intersects one or more of the vertical fractures near the toe to supply the opposite polarity. Modeling suggests that temperatures in the immediate vicinity of the fracture exceed 600° C. Thermal conduction heats and artificially matures the oil shale to conversion temperatures in excess of 300° C.

The WO 2005/045192 process involves the circulation of supercritical naphtha through fractures. This means that the oil shale is heated by circulating a dense, hot hydrocarbon vapor through sets of closely-spaced hydraulic fractures. In this instance, the fractures are horizontally formed and conventionally propped. Fracture temperatures of 320°-400° C. are maintained for five to ten years. Vaporized naphtha is typically the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

In some oil shale formations, additional minerals of commercial value are present within the rock. One such mineral is nahcolite. Nahcolite is a natural mineral ($NaHCO_3$), and is commonly known as baking soda or sodium bicarbonate. The mineral can be associated with oil shale deposits such as those located in parts of the Piceance Basin in Colorado. Nahcolite resources in the Piceance Basin are estimated by the United States Geological Survey at over 29 billion metric tons. (J. R. Dyni, "Stratigraphy and Nahcolite Resources of the Saline Facies of the Green River Formation in Northwest Colorado," in D. K. Murray (ed.), Guidebook to the Energy Resources of the Piceance Creek Basin Colorado, Rocky Mountain Association of Geologists—1974 Guidebook, pp. 111-122 (1974)). The entire disclosure of which is incorporated herein by reference.

Nahcolite typically occurs as finely disseminated crystals and nodules within oil shale beds. It also occurs in several discrete beds mixed with variable amounts of oil shale and sometimes associated with halite. Much of the nahcolite in the Piceance Basin occurs as either non-bedded crystalline aggregates scattered through the oil shale, or as laterally continuous units of fine crystals disseminated in the oil shale. The sodium bicarbonate processed from nahcolite has value for use in food (as baking soda), in pharmaceutical products, in flue gas clean-up (such as $SO_2$ removal), and in fire extinguishers.

Sodium bicarbonate can be converted to sodium carbonate ($Na_2CO_3$; also known as soda ash). The conversion takes place in the presence of heat according to the following chemical reaction:

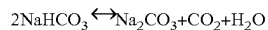
$$2NaHCO_3 \leftrightarrow Na_2CO_3 + CO_2 + H_2O$$

Sodium carbonate, or soda ash, is a large-scale commodity chemical. Soda ash is used in glass making, chemical manufacture, and the manufacture of detergents. Much of the sodium bicarbonate produced via mining is converted in surface facilities to soda ash.

Nahcolite can be recovered from oil shale via solution mining. (M. Prats, P. J. Closmann, A. T. Ireson, and G. Drinkard, "Soluble-Salt Processes for In-Situ Recovery of Hydrocarbons from Oil Shale," Journal of Petroleum Technology, pp. 1078-1088 (September 1977)). The entire disclosure of which is incorporated herein by reference. The process involves injecting hot water under pressure into the subsurface. Sodium bicarbonate is fairly soluble in water.

American Soda previously developed a facility in the Piceance region of Colorado for solution mining of Nahcolite. The facility was operational in 2000. American Soda's production operations are described in the 2004 publication M. Ramey and M. Hardy, "The History and Performance of Vertical Well Solution Mining of Nahcolite ($NaHCO_3$) in the Piceance Basin, Northwestern, Colorado, USA", Solution Mining Research Institute: Fall 2004 Technical Meeting (Berlin, Germany) (2004). The entire disclosure of which is incorporated herein by reference. American Soda's solution mining technology is also discussed in U.S. Pat. No. 6,609,761 issued in 2003. The entire disclosure of which is incorporated herein by reference. According to the paper, the well field included 26 solution mining wells which produced nahcolite brine to a processing facility. Water at 350-420° F. was injected into the formation to remove the nahcolite at a depth of 2,200 to 2,600 feet.

By late 2004, the American Soda facility had produced 2.6 million tons of nahcolite. The facility converted the sodium bicarbonate to sodium carbonate, produced liquid $CO_2$, and concentrated the sodium carbonate solution via evaporation. The solution was then pumped to a second facility 44 miles away. The conversion of sodium bicarbonate to sodium carbonate was necessary to prevent solid precipitation in the pipeline as the solution cooled during transit. Sodium carbonate is much more soluble than sodium bicarbonate at the flow temperatures. The solution at the second facility was then reconverted back to sodium bicarbonate via contacting the solution with $CO_2$ to precipitate the sodium bicarbonate. The sodium bicarbonate was then sold and shipped from the facility.

Other companies such as White River Nahcolite Minerals and American Alkali have studied Nahcolite solution mining and processing. (R. L. Day, "Solution Mining of Colorado Nahcolite," Wyoming State Geological Survey Public Information Circular 40, Proceedings of the First International Soda Ash Conference, Volume II (Rock Springs, Wyo., Jun. 10-12, 1997) pp. 121-130 (1998); K. R. Nielsen, "Colorado Nahcolite: A Low Cost Source of Sodium Chemicals," Seventh Annual Canadian Conference on Markets for Industrial Minerals (Vancouver, Canada, Oct. 17-18, 1995) 1-9). The entire disclosures of which are incorporated herein by reference. In the disclosed processes, the produced sodium bicarbonate solution is processed through a facility in order to generate three dry products: sodium bicarbonate, light soda ash, and dense soda ash. The processes start by crystallizing sodium bicarbonate out of solution via cooling. Light soda ash is produced by drying wet sodium bicarbonate at 600-800° F. This results in decomposition to a low bulk density (30-35 lbs/ft$^3$) powder. Dense soda ash is formed by crystallizing soda ash out of a supersaturated solution. This results in granules with a bulk density of about 63 lbs/ft$^3$. The benefit of producing three products is that each has a different market. The facility can shift the distribution of products based on current market conditions. Typically, sodium bicarbonate and light soda ash command higher prices, but the markets are more limited than for dense soda ash.

Another company involved in Nahcolite mining operations is NaTec, Ltd. NaTec is the listed assignee of U.S. Pat. No. 4,815,790 which issued in 1989, the entire disclosure of which is incorporated herein by reference. The patent is entitled "Nahcolite Solution Mining Process." The patent discloses a process for creating sodium bicarbonate using a "hot aqueous liquor." This process also produced sodium bicarbonate solution which was then processed through a facility to generate three dry products: sodium bicarbonate, light soda ash, and dense soda ash. It is noted that much of the nahcolite was converted to a soda ash product at the surface facilities.

Because nahcolite and oil shale occur together in certain oil shale deposits such as the Piceance Basin, the recovery of either mineral impacts the fate of the other. It has been proposed that nahcolite can be removed through solution mining prior to the in situ production of shale oil. This was discussed by Prats, M., et al. in the 1977 articled cited above. This was also proposed by Shell as early as 1972 in U.S. Pat. No. 3,700,280, entitled "Method of Producing Oil from an Oil Shale Formation Containing Nahcolite and Dawsonite", the entire disclosure of which is incorporated herein by reference. See also U.S. Pat. No. 3,759,574 entitled "Method of Producing Hydrocarbons from an Oil Shale Formation", the entire disclosure of which is incorporated herein by reference. The concept of nahcolite removal involves leaching the nahcolite (and other water-soluble minerals such as halite and, to a lesser degree, dawsonite) to create permeability in the otherwise fairly impermeable oil shale. After the permeability is created, hot steam is injected into the formation to convert the kerogen bound in the oil shale to liquid (oil) and hydrocarbon gas. The oil and gas is then recovered via production wells.

Recently, U.S. Pat. No. 6,997,518 issued to Vinegar, et al. in 2006, the entire disclosure of which is incorporated herein by reference. This patent is entitled "In Situ Thermal Processing and Solution Mining of an Oil Shale Formation." The '518 patent proposes developing nahcolite prior to in situ conversion of the oil shale using downhole heat sources. Such heat sources include electric heaters and downhole flameless combustors. Vinegar argues that removing the nahcolite prior to shale oil production is beneficial since it reduces the energy needed to convert the kerogen. The decomposition reaction of nahcolite is endothermic plus the nahcolite has thermal capacity and, hence, drains energy otherwise useable for heating the oil shale. Additionally, in certain areas regulatory conditions require that the oil shale be developed in such a way as to preserve the value of the nahcolite.

The '518 patent lists a variety of other perceived advantages to removing nahcolite (and dawsonite) prior to kerogen retorting. For instance, Vinegar states that removing the nahcolite "may reduce mass within the formation and increase a permeability of the formation. Reducing the mass within the formation may reduce the heat required to heat to temperatures needed for the in situ conversion process. Reducing the mass within the formation may also increase a speed at which a heat front within the formation moves. Increasing the speed of the heat front may reduce a time needed for production to begin." (See col. 324, ln. 40-48).

A need exists for improved processes for the production of shale oil which preserves the value of the nahcolite in-place. In addition, a need exists for improved methods for co-developing shale oil and nahcolite in soda ash form. Still further, a need exists for a process by which the nahcolite may be recovered after heating an oil shale zone and producing the shale oil.

SUMMARY OF THE INVENTION

In one embodiment, the invention includes an in situ method of recovering natural resources. The method includes (a) heating in situ an organic-rich rock formation that contains both formation hydrocarbons and one or more formation water-soluble minerals, wherein the heating of the organic-rich rock formation both pyrolyzes at least a portion of the formation hydrocarbons to create hydrocarbon fluids and makes available one or more migratory contaminant species previously bound in the organic-rich rock formation. The method may further include producing at least a portion of the hydrocarbon fluids from the organic-rich rock formation, but wherein at least a portion of the one or more migratory contaminant species remain in the organic-rich rock formation. The method may further include injecting an aqueous fluid into the organic-rich rock formation, wherein the injected aqueous fluid dissolves at least a portion of one or more water-soluble minerals and the one or more migratory contaminant species to form a first aqueous solution. The method may further include producing the first aqueous solution from the organic-rich rock formation. The method may further include processing the first aqueous solution in a surface facility to remove a portion of the one or more water-soluble minerals and processing the first aqueous solution in the surface facility to remove at least some of the one or more migratory contaminant species.

Another embodiment of the invention includes an in situ method of recovering natural resources. The method includes heating an organic-rich rock formation in situ. The organic-rich rock formation (i) is substantially impermeable to fluid flow initially, (ii) contains formation hydrocarbons, and (iii) contains one or more formation water-soluble minerals. The heating (i) pyrolyzes at least a portion of the formation hydrocarbons in a matured organic-rich rock zone of the organic-rich rock formation to create hydrocarbon fluids, thereby creating permeability within the matured organic-rich rock zone, (ii) leaves a second portion of the formation hydrocarbons substantially unpyrolyzed, thereby preserving an unmatured organic-rich rock zone, and (iii) converts at least a portion of the one or more formation water-soluble minerals to one or more first water-soluble minerals. The method may further include producing the hydrocarbon fluids from the matured organic-rich rock zone. The method may further include flushing the matured organic-rich rock zone and the unmatured organic-rich rock zone with an aqueous fluid after a substantial portion of the hydrocarbon fluids have been produced from the matured organic-rich rock zone, thereby dissolving the one or more first water-soluble minerals in the aqueous fluid to form a first aqueous solution and producing the first aqueous solution to the surface.

Another embodiment of the invention includes an in situ method of recovering natural resources. The method includes heating the organic-rich rock formation in situ. The organic-rich rock formation (i) contains formation hydrocarbons and (ii) contains one or more formation water-soluble minerals. The heating (i) pyrolyzes at least a portion of the formation hydrocarbons to create hydrocarbon fluids and (ii) generates water which migrates and at least partially dissolves the one or more formation water-soluble minerals in situ to form a first aqueous fluid. The method may further include producing a production fluid from the organic-rich rock formation with the production fluid containing the hydrocarbon fluids and the first aqueous fluid. The method may further include separating the production fluid into a hydrocarbon stream and a first aqueous stream at a surface facility and recovering one or more first water-soluble minerals from the first aqueous stream.

Another embodiment of the invention includes an in situ method of recovering natural resources. The method includes assessing the market price for a water-soluble mineral. The method may further include comparing the market price for the water-soluble mineral to a cost-to-produce criterion. The method may further include determining that the market price of the water-soluble-mineral is less than the cost-to-produce criterion. The method may further include heating an organic-rich rock formation in situ. The organic-rich rock formation (i) contains formation hydrocarbons and (ii) contains one or more formation water-soluble minerals. The heating (i) occurs prior to substantial removal of the one or more formation water-soluble minerals, (ii) pyrolyzes at least a portion of the formation hydrocarbons to create hydrocarbon fluids, and (iii) converts at least a portion of the one or more formation water-soluble minerals to first water-soluble minerals. The method may further include producing the hydrocarbon fluids from the organic-rich rock formation.

Another embodiment of the invention includes an in situ method of recovering natural resources. The method includes providing produced fluid processing facilities which are sized to process a first hydrocarbon fluid production rate produced during an initial production period together with a first $CO_2$ production rate produced during the initial production period, wherein the first $CO_2$ production rate includes $CO_2$ generated from dissociation of nahcolite to form soda ash. The method may further include heating an organic-rich rock formation in situ to form hydrocarbon fluids and $CO_2$ with the organic-rich rock formation containing nahcolite. The method may further include producing a production fluid containing the hydrocarbon fluids and the $CO_2$ from the organic-rich rock formation. The method may further include processing the production fluid in the produced fluid processing facilities.

BRIEF DESCRIPTION OF THE DRAWINGS

So that the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
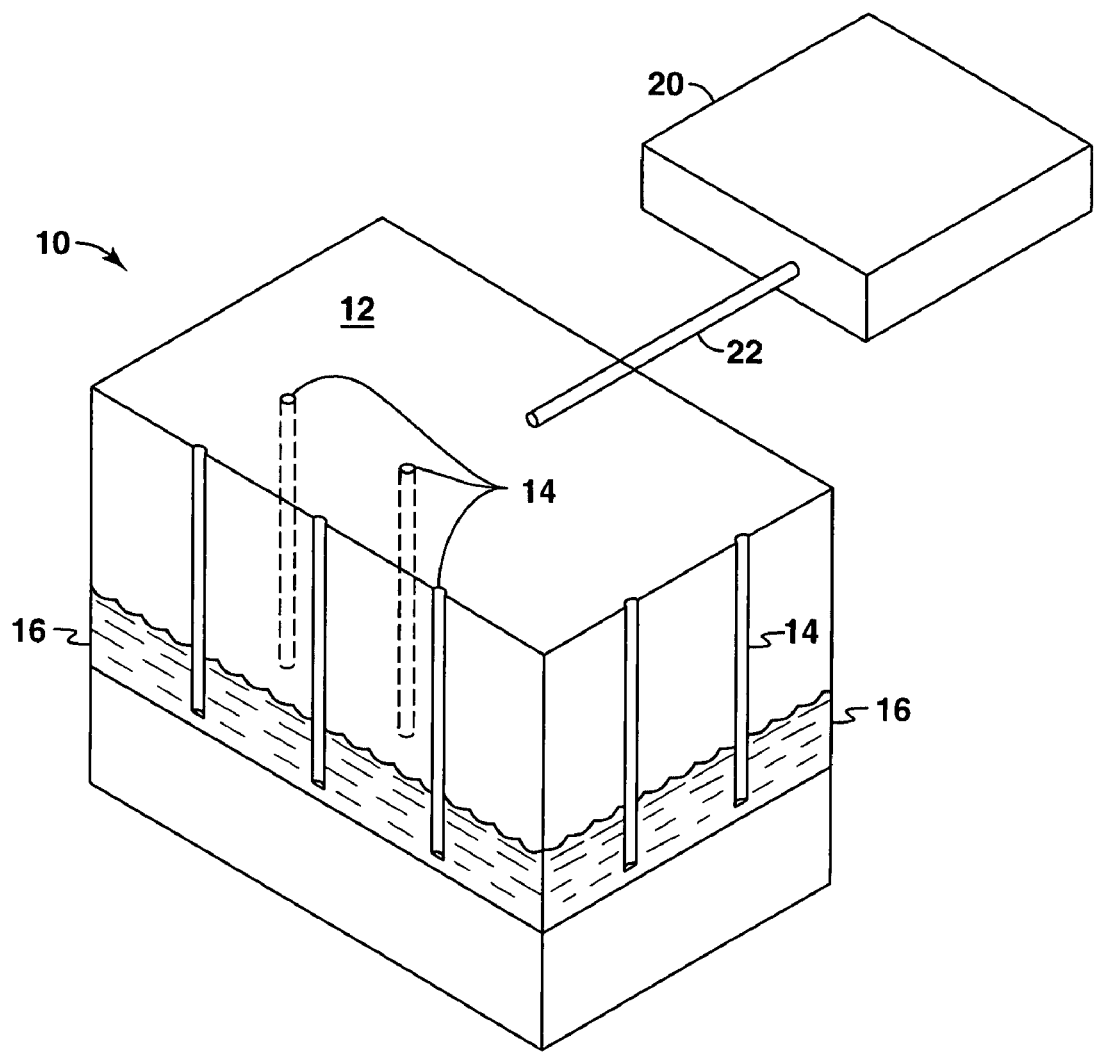
FIG. 1 is a perspective view of an illustrative oil shale development area. A plurality of wellbores is shown completed in an oil shale formation. A fluid processing area is also shown schematically.

As used herein, the term "hydrocarbon(s)" refers to organic material with molecular structures containing carbon and hydrogen. Hydrocarbons may also include other elements, such as, but not limited to, halogens, metallic elements, nitrogen, oxygen, and/or sulfur.

As used herein, the term "hydrocarbon fluids" refers to hydrocarbons that are gases or liquids. Hydrocarbon fluids may include, for example, shale oil, pyrolysis oil, pyrolysis gas, a pyrolysis product of coal, and other hydrocarbons that are in a gaseous or liquid state.

As used herein, the terms "produced fluids" and "production fluid" refer to liquids and/or gases removed from an organic-rich rock formation and may include hydrocarbon fluids, shale oil, pyrolysis oil, pyrolysis gas, a pyrolysis product of coal, synthesis gas, and water (steam). Produced fluids may include hydrocarbon fluids as well as non-hydrocarbon fluids.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C. Heavy hydrocarbons may also include aromatics or other complex ring hydrocarbons.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in a formation. Formation hydrocarbons may be, but are not limited to, kerogen, coal, bitumen, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a fluid containing a mixture of condensable hydrocarbons.

As used herein, the term "organic-rich rock" refers to any rock matrix holding formation hydrocarbons (i.e. solid hydrocarbons and/or heavy hydrocarbons). Rock matrices may include, but are not limited to, sedimentary rocks, shales, stone silt, sands, silicilytes, carbonates, and diatomites.

As used herein, the term "formation" refers to one or more hydrocarbon containing layers, one or more non-hydrocarbon layers, an overburden, and/or an underburden of any subsurface geologic formation. An "overburden" and/or an "underburden" includes one or more different types of substantially impermeable materials. For example, overburden and/or underburden may include rock, shale, mudstone, or wet/tight carbonate (i.e., an impermeable carbonate without hydrocarbons). In some embodiments of in situ conversion processes, an overburden and/or an underburden may include a hydrocarbon containing layer or hydrocarbon containing layers that are relatively impermeable and are not subjected to temperatures during in situ conversion processing that result in significant characteristic changes of the hydrocarbon containing layers of the overburden and/or underburden. For example, an underburden may contain shale or mudstone. In some cases, the overburden and/or underburden may be somewhat permeable.

As used herein, the term "organic-rich rock formation" refers to any formation containing organic-rich rock.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof.

As used herein, the term "formation water-soluble minerals" refers to water-soluble minerals that are found naturally in a formation.

As used herein, the term "migratory contaminant species" refers to species that are both soluble or moveable in water or an aqueous fluid and are considered to be harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "wellbore" refers to a hole in a formation made by drilling or insertion of a conduit into the formation. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

As used herein, the term "pyrolysis" refers to the breaking of chemical bonds due to the application of heat. For example, pyrolysis may include transforming a compound into one or more other substances by heat alone or by heat in combination with an oxidant. Pyrolysis may include modifying the nature of the compound by addition of hydrogen, water, carbon dioxide, or carbon monoxide. Heat may be transferred to a section of the formation to cause pyrolysis.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to storing a fluid that is a by-product of a process rather than discharging the fluid to the atmosphere or open environment.

As used herein, the term "subsidence" refers to a downward movement of a portion of a formation relative to an initial elevation of the surface.

As used herein, the term "thickness" of a layer refers to the thickness of a cross section of a layer, wherein the cross section is normal to a face of the layer.

As used herein, the term "thermal fracture" refers to fractures created in a formation caused directly or indirectly by expansion or contraction of a formation and/or fluids within the formation, which is in turn caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated along a plane in a formation, wherein the fracture is created through injection of fluids into a formation. The fracture may include proppant material.

Description of Specific Embodiments

The inventions are described herein in connection with certain specific embodiments. However, to the extent that the following detailed description is specific to a particular embodiment or a particular use, this is intended to be illustrative only, and is not to be construed as limiting the scope of the invention.

The present invention provides an in situ method for generating and recovering both hydrocarbon fluids and water-soluble minerals (e.g., sodium minerals) from an organic-rich rock formation (e.g., oil shale formations). In some oil shale formations such as the Parachute Creek Member of the Green River Formation located in the Piceance Basin in Colorado, the oil shale holds both kerogen and nahcolite. It may be desirable in multi-mineral leasing areas, such as those managed by the United States Bureau of Land Management, that the production of shale oil from kerogen does not squander or waste the value of the in situ nahcolite. Thus, in one aspect, the present invention provides for the production of shale oil, followed by the recovery of water-soluble minerals, particularly nahcolite or decomposition products of nahcolite, for example, soda ash. In another aspect, shale oil and nahcolite (or nahcolite derivates) are co-produced. In either aspect, the value of the water-soluble minerals is preserved.

Sodium bicarbonate can be converted to sodium carbonate ($Na_2CO_3$; also known as soda ash). The conversion takes place in the presence of heat according to the following chemical reaction formula:

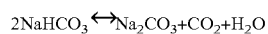

$2NaHCO_3 \leftrightarrow Na_2CO_3 + CO_2 + H_2O$

The water generated via nahcolite decomposition may be in the vapor state but can condense to liquid water as it migrates away from the heated region. Water may also be generated via decomposition of other minerals, such as dawsonite, decomposition of kerogen, and expulsion of bound water from clays.

Sodium carbonate, or soda ash, is a large-scale commodity chemical. Soda ash is used in glass making, chemical manufacture, and the manufacture of detergents. Much of the sodium bicarbonate produced via mining is converted in surface facilities to soda ash. The decomposition of sodium bicarbonate to sodium carbonate can occur at relatively low temperatures; however, the process is pressure sensitive. As pressure increases, the concentration of carbon dioxide in the vapor phase increases and retards the decomposition. Templeton studied this effect and found that the decomposition temperature increases as follows:

from ~200° F. at atmospheric pressure, to
~360° F. at 1000 psia, to
~385° F. at 2000 psia, and to
~405° F. at 3000 psia.

(Templeton, C. C., "Pressure-Temperature Relationship for Decomposition of Sodium Bicarbonate from 200 to 600° F.," Journal of Chemical and Engineering Data, 23(1), pp. 7-11 (1978)). The entire disclosure of which is incorporated herein by reference.

Dawsonite decomposes via the following reaction:

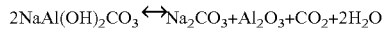

$$2NaAl(OH)_2CO_3 \leftrightarrow Na_2CO_3 + Al_2O_3 + CO_2 + 2H_2O$$

Nahcolite can be recovered from oil shale via solution mining. The process involves injecting hot water under pressure into the subsurface. Sodium bicarbonate is fairly soluble in water. Solubility increases with temperature as follows:

~0.1 lb $NaHCO_3$/lb water at 100° F.,
~0.2 lb $NaHCO_3$/lb water at 200° F.,
~0.4 lb $NaHCO_3$/lb water 300° F., and
~0.8 lb $NaHCO_3$/lb water 400° F.

Applicant believes that certain in situ oil shale retorting processes, including the WO 2005/045192 and WO 2005/010320 processes disclosed in the above-referenced international patent publications, will materially improve the accessibility of the nahcolite and therefore increase the value derived from solution mining.

It is noted that at very high temperatures, soda ash will decompose to sodium oxide according to the following reaction:

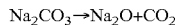

$$Na_2CO_3 \rightarrow Na_2O + CO_2$$

In a swept atmosphere this will occur at about 800° C. In a $CO_2$ atmosphere the decomposition is strongly suppressed even at 1000° C. (Newkirk, A. E. and Aliferis, I., "Drying and Decomposition of Sodium Carbonate," Analytical Chemistry, 30(5), pp. 982-984 (1958)). The entire disclosure of which is incorporated herein by reference. In solution sodium carbonate can decompose at much lower temperatures to sodium hydroxide:

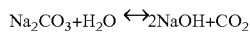

$$Na_2CO_3 + H_2O \leftrightarrow 2NaOH + CO_2$$

This reaction, however, is very much an equilibrium reaction and unless the $CO_2$ is continually removed, the conversion is limited. (Thomas, A. M., "Thermal Decomposition of Sodium Carbonate Solutions", Journal of Chemical and Engineering Data, 8(1), pp. 51-54 (1963)). The entire disclosure of which is incorporated herein by reference. Indeed, sodium hydroxide reacts readily with acid gases (such as $CO_2$, $H_2S$ and $SO_2$) to produce $Na_2CO_3$. This reverse reaction is commonly used in the chemical industry for scrubbing $CO_2$ from gas streams. (Encyclopedia of Chemical Technology ($4^{th}$ ed.), "Alkali and Chlorine Products," pp. 1025-1039). The entire disclosure of which is incorporated herein by reference.

FIG. 1 presents a perspective view of an illustrative oil shale development area 10. A surface 12 of the development area 10 is indicated. Below the surface is an organic-rich rock formation 16. The illustrative formation 16 contains formation hydrocarbons (such as, for example, kerogen) and valuable water-soluble minerals (such as, for example, nahcolite). It is understood that the representative formation 16 may be any organic-rich rock formation, including a rock matrix containing coal or tar sands, for example. In addition, the rock matrix making up the formation may be permeable, semi-permeable or non-permeable. Preferably, the present inventions may be practiced in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. Alternatively, the wellbores may be spaced from 30 to 200 feet or 50 to 100 feet. Typically, the wellbores 14 are also completed at shallow depths, being from 200 to 5,000 feet at total depth. Alternatively, the wellbores may be completed at depths from 1,000 to 4,000 feet, or 1,500 to 3,500 feet. In some embodiments the oil shale formation targeted for in situ retorting is at a depth greater than 200 feet below the surface. In alternative embodiments, the oil shale formation targeted for in situ retorting is at a depth greater than 1000, 1100, 1200, 1300 or 1500 feet below the surface. In alternative embodiments, the oil shale formation targeted for in situ retorting is at a depth between 200 and 5,000 feet, alternatively between 1,000 and 4,000 ft, 1,200 and 3,700 feet, or 1,500 and 3,500 feet below the surface.

The wellbores 14 will be selected for certain functions and may be designated as heat injection wells, water injection wells, oil production wells or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 20 is also shown schematically. The fluid processing facility 20 is equipped to receive fluids produced from the organic-rich rock formation 16 through one or more pipelines or flow lines 22. The fluid processing facility 20 may include equipment suitable for receiving and separating oil, gas, and water produced from the heated formation. The fluid processing facility 20 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, tri-methylbenzene, and polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

The contaminants may be removed in surface facilities by various means. One such method is via an adsorbent material such as activated carbon, activated alumina, silica gel, clay, or fuller's earth. Another such method is to employ bio-oxidation to treat the organic contaminants. Because of the potential for ground water contaminants, one optional step in the method is to assess the hydrological connectivity of the oil shale zone with aquifers to determine the risk to ground water.

The dissolved water-soluble minerals removed from the oil shale formation are preferably ones with chemical compositions that include sodium. Examples of sodium minerals include nahcolite (sodium bicarbonate), soda ash (sodium carbonate), or dawsonite ($NaAl(CO_3)(OH)_2$), or combinations thereof. In some instances, the soluble minerals are generated via decomposition of other minerals due to the oil shale heating. Preferably, the original soluble mineral is nahcolite, and the decomposed mineral is soda ash.

The dissolved water-soluble minerals may be removed from the produced fluid in one aspect by precipitation caused by altering the temperature of the solution. The soda ash (sodium carbonate) may be converted back to nahcolite (sodium bicarbonate) in surface facilities via reaction with $CO_2$.

Alternatively, the equipment for separating out water dissolved minerals and contaminants are in other facilities.

Figure 2:
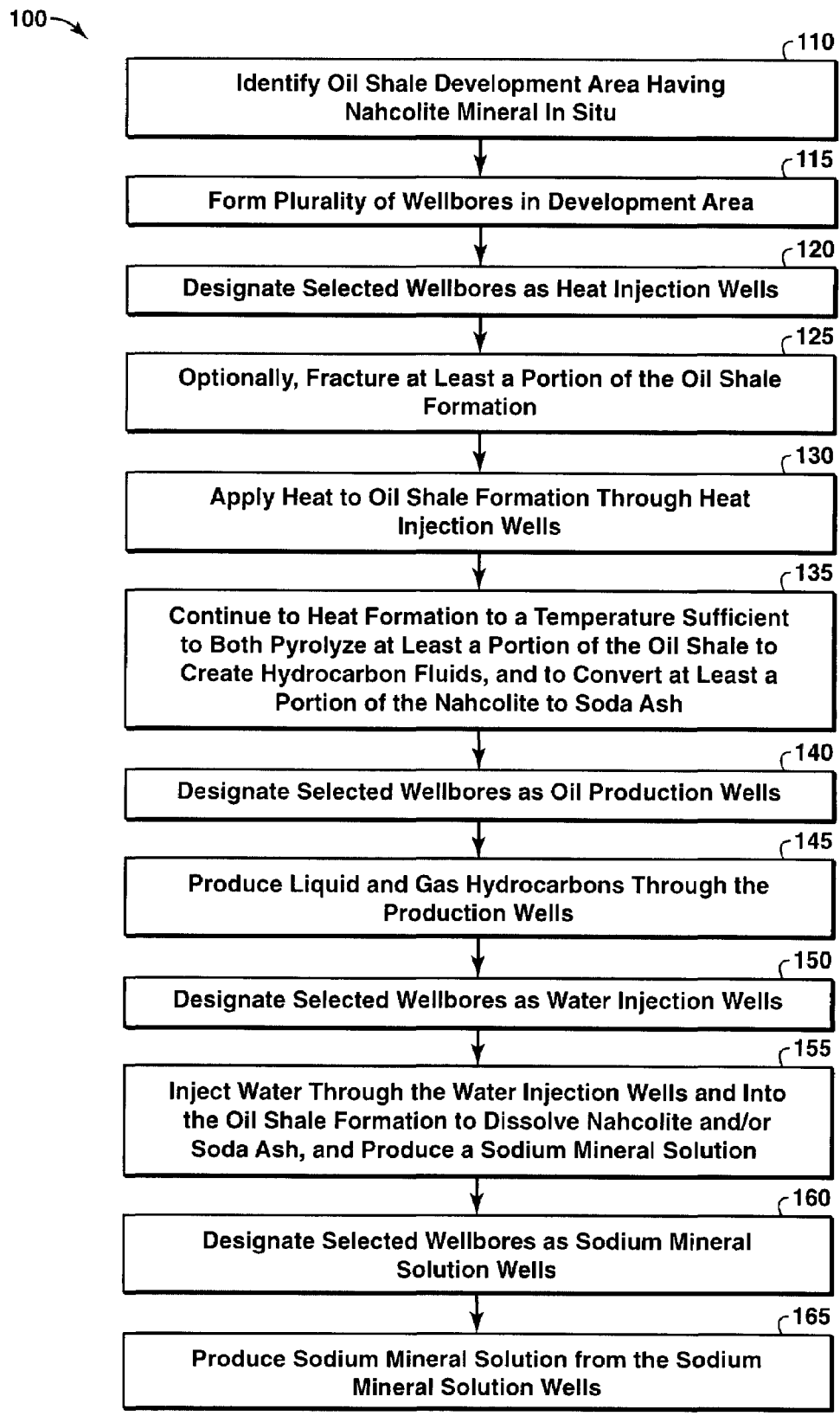
FIG. 2 is a flow chart showing a series of steps that may be undertaken in the production of hydrocarbon fluids and the recovery of nahcolite from an oil shale formation, in accordance with one aspect of the present methods.

In order to recover oil, gas, and sodium (or other) water-soluble minerals, a series of steps are undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain subsurface rock samples. Rock samples may be analyzed to assess kerogen content and fluid hydrocarbon generating capability. The richness of the organic-rich rock formation may be ascertained from well or outcrop samples using a variety of data including but not limited to organic carbon content, hydrogen index, or modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the total initial heat injection wells and hydrocarbon production wells need be completed.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120. In one aspect, wellbores are placed in a pattern such that untreated pillars of oil shale are left to support the overburden and prevent subsidence.

There are various methods for applying heat to the organic-rich rock formation 16. One such method involves the use of electrical resistive heating elements in a cased or uncased wellbore. Other methods include the use of circulated hot fluids, downhole combustors, in situ combustion, radio-frequency (RF) electrical energy, or microwave energy. Still others include injecting a hot fluid into the oil shale formation to directly heat it. The present methods are not limited to the heating technique employed. The heating step is represented generally by box 130. Preferably, for in situ processes the heating of a production zone takes place over a period of months, or even four or more years. Alternatively, the formation may be heated for one to fifteen years, alternatively, 3 to 10 years, 1.5 to 7 years or 2 to 5 years. The bulk of the target zone of the formation may be heated to between 270 to 800° C. Alternatively, the bulk of the target zone of the formation may be heated to between 300 to 400° C. Preferably, the bulk of the target zone is ultimately heated to a temperature below 400° C. (752° F.).

In connection with the heating step 130, the rock formation 16 may optionally be fractured to aid heat transfer or hydrocarbon fluid production. The optional fracturing step is shown in box 125. Fracturing may also be accomplished by creating thermal fractures within the formation through application of heating. Alternatively, a process known as hydraulic fracturing may be used. By heating the organic-rich rock and transforming the kerogen to oil and gas, the permeability is increased via thermal fracture formation and subsequent production of a portion of the hydrocarbon fluids generated from the kerogen. Thermal fracture formation is caused by thermal expansion of the rock and fluids and by chemical expansion of the transforming kerogen into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thermal fractures increase permeability and aid fluid flow within the formation. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for an extended heat source, such as in the WO 2005/010320 method.

Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 3.

Figure 3:
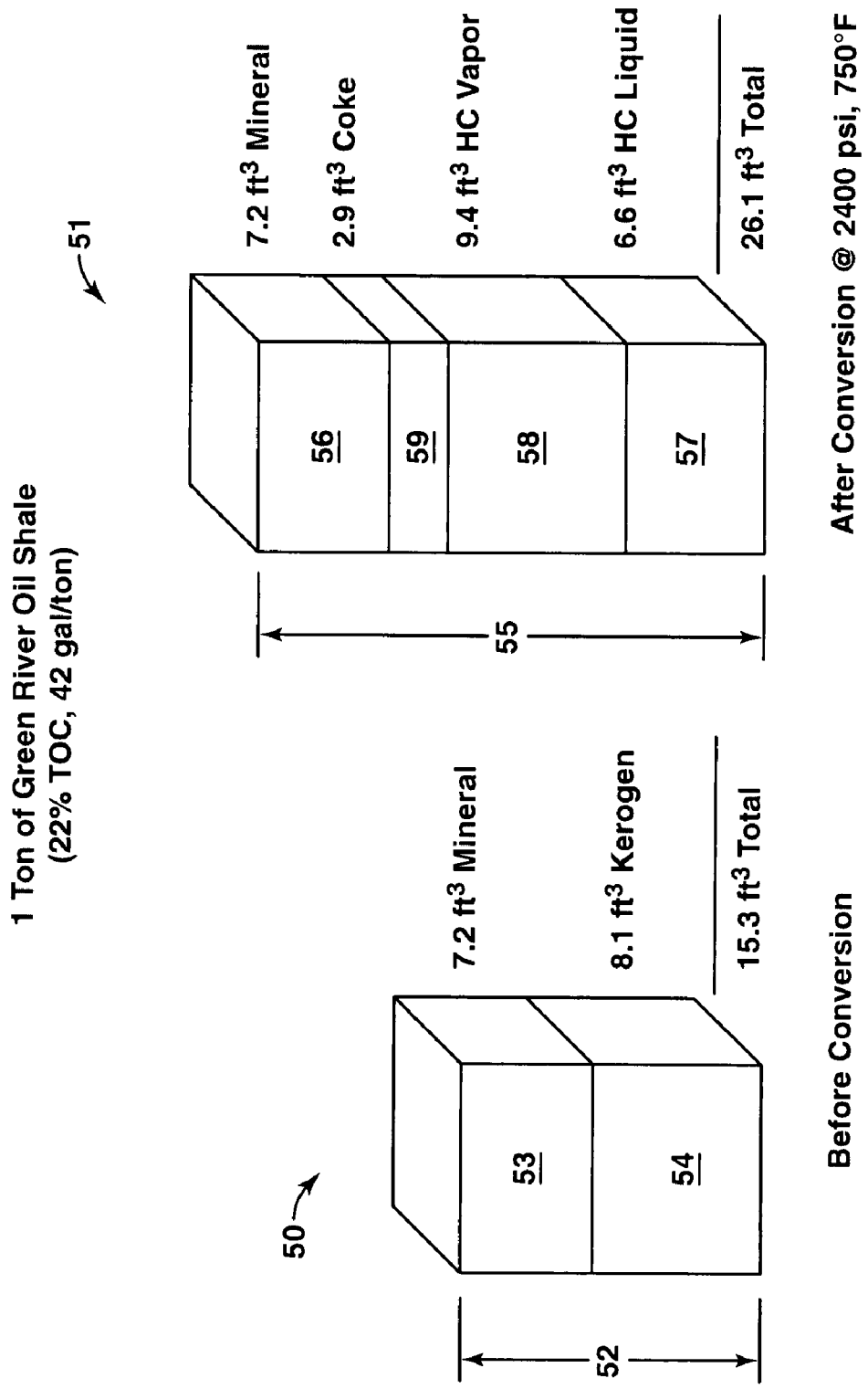
FIG. 3 is a bar chart comparing the volume of an oil shale sample before and after an in situ, retorting process.

FIG. 3 provides a bar chart comparing one ton of Green River oil shale before 50 and after 51 a simulated in situ, retorting process. The simulated process was carried out at 2,400 psi and 750° F. Before the conversion, a total of 15.3 ft³ of rock matrix 52 existed. This matrix comprised 7.2 ft$^3$ of mineral 53, i.e., shale, and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, i.e., oil, 9.4 ft$^3$ of hydrocarbon gas 58, and 2.9 ft$^3$ of coke 59. It can be seen that substantial volume expansion occurred during the conversion process. This, in turn, increases permeability of the rock structure.

The formation 16 is heated to a temperature sufficient to pyrolyze at least a portion of the oil shale in order to pyrolyze the kerogen and to create hydrocarbon fluids. The resulting liquids and hydrocarbon gases may be refined into products which resemble common commercial petroleum products. Such liquid products include transportation fuels such as diesel, jet fuel and naphtha. Generated gases include light alkanes, light alkenes, $H_2$, $CO_2$, CO, and $NH_3$. Conversion of the oil shale will create permeability in the oil shale section in rocks that were originally impermeable. Preferably, the heating process, shown by box 135, occurs over a lengthy period of time. In one aspect, the heating period is from three months to four or more years. Also as part of box 135, the formation 16 is heated to a temperature sufficient to convert at least a portion of nahcolite, if present, to soda ash. Heat used to mature the oil shale and recover oil and gas will also convert nahcolite to sodium carbonate (soda ash), a related sodium mineral. The process of converting nahcolite (sodium bicarbonate) to soda ash (sodium carbonate) has been described above.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14.

After certain wellbores 14 have been designated as oil and gas production wells, oil and/or gas is produced from the wellbores 14. The oil and/or gas production process is shown at box 145. At this stage (box 145), the water-soluble minerals, such as nahcolite and converted soda ash remain substantially trapped in the rock formation 16 as finely disseminated crystals or nodules within the oil shale beds, and are not produced. However, some nahcolite and/or soda ash may be dissolved in the water created during heating within the formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

Box 150 presents a typical next step in the oil and gas recovery method 100. Here, certain wellbores 14 are designated as water or aqueous fluid injection wells. Aqueous fluids are solutions of water that may contain other species. The other species may be present to alter the pH. Alternatively, the other species may reflect the availability of brackish water not saturated in the species wished to be leached from the subsurface. As used herein, an aqueous fluid is meant to refer to water including other species and water that does not include other species. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, water or an aqueous fluid is injected through the water injection wells and into the oil shale formation 16. This step is shown at box 160. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

In some cases water injection wells may not be necessary if a sufficiently strong connected aquifer is present. In this case, drawing on production wells may allow existing subsurface waters to flow into the heated formation and serve the purpose of water injection.

The injection of water into the organic-rich rock formation 16 causes the water to contact water-soluble minerals and various migratory contaminant species. Preferably the water-soluble minerals are soda ash and any unconverted nahcolite. As the heated water sweeps through the rock formation 16, a water-soluble mineral solution is formed. Sodium carbonate, or soda ash, is soluble in water and is readily recovered by solution mining. Saturated sodium carbonate solutions may have about 32 wt. % $Na_2CO_3$ in water at temperatures between 30° C. and 140° C., about 23 wt. % at 200° C., and about 8.4 wt. % at 300° C.

Along with the designation of certain wellbores 14 as water injection wells, the design engineers may also designate certain wellbores 14 as water or water-soluble mineral solution production wells. These wells may be the same as wells used to previously produce hydrocarbons or inject heat. These recovery wells will produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (box 165).

It is also noted that producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, flourides and phenols. If oxygen or air is employed, contaminant species may also include ketones, alcohols, and cyanides.

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow from inside the heated zone from leaving the zone.

Figure 4:
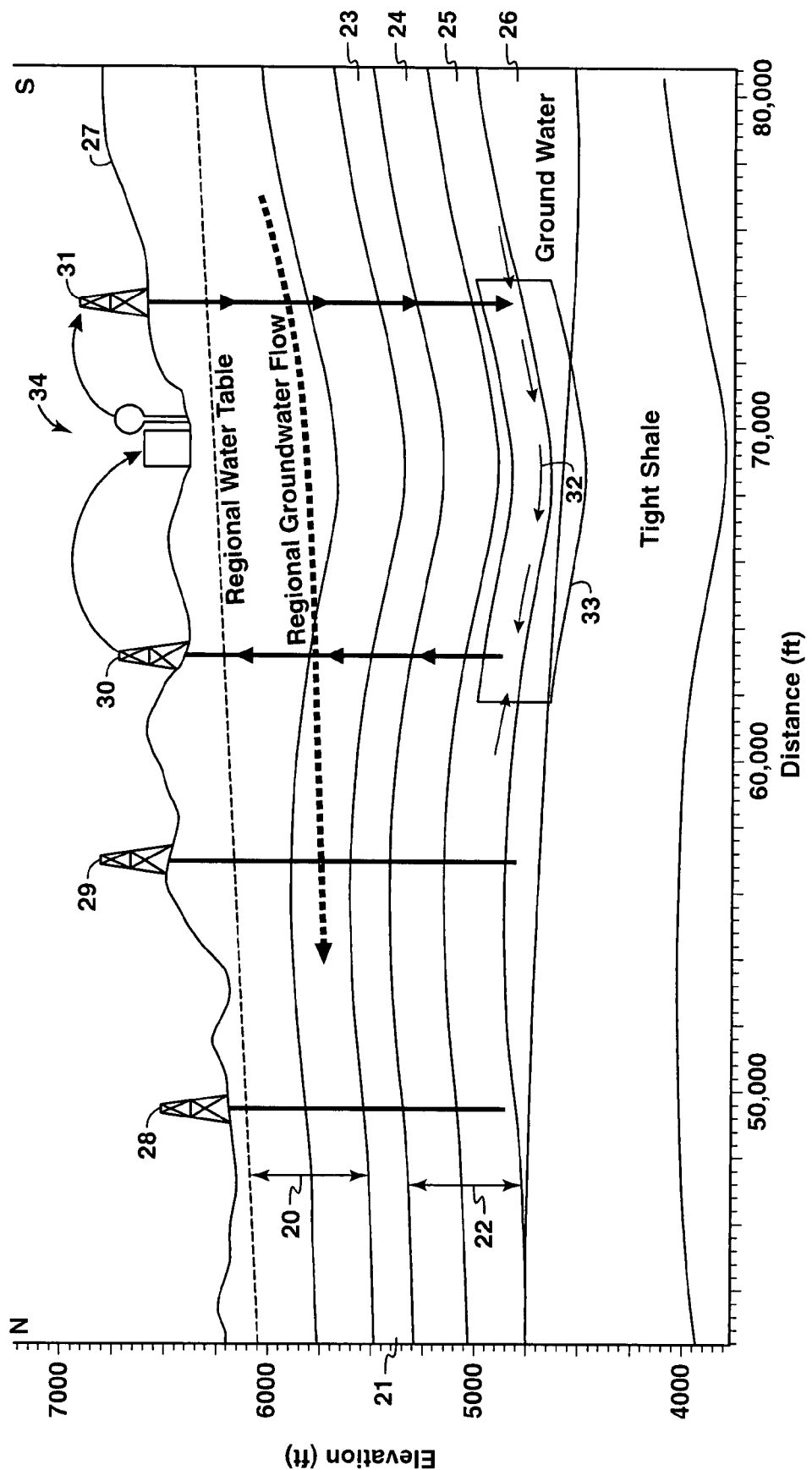
FIG. 4 is a schematic diagram of a solution mining and/or groundwater clean-up operation.

FIG. 4 is a cross-sectional view of an illustrative oil shale formation that is within or connected to ground water aquifers and the formation leaching operation. Four separate oil shale formation zones are depicted (23, 24, 25 & 26) within the oil shale formation. The water aquifers are below the ground surface 27, and are categorized as an upper aquifer 20 and a lower aquifer 22. Intermediate between the upper and lower aquifers is an aquitard 21. It can be seen that certain zones of the formation are both aquifers or aquitards and oil shale zones. A plurality of wells (28, 29, 30, & 31) is shown traversing vertically downward through the aquifers. One of the wells is serving as a water injection well 31, while another is serving as a water production well 30. In this way, water is circulated 32 through at least the lower aquifer 22.

FIG. 4 shows diagrammatically the water circulation 32 through an oil shale volume that was heated 33, that resides within or is connected to an aquifer 22, and from which hydrocarbon fluids were previously recovered. Introduction of water via the water injection well 31 forces water into the previously heated oil shale 33 and water-soluble minerals and migratory contaminants species are swept to the water production well 30. The water is then processed in a facility 34 wherein the water-soluble minerals (e.g. nahcolite or soda ash) and the migratory contaminants are substantially removed from the water stream. Water is then reinjected into the oil shale volume 33 and the formation leaching is repeated. This leaching with water is intended to continue until levels of migratory contaminant species are at environmentally acceptable levels within the previously heated oil shale zone 33. This may require 1 cycle, 2 cycles, 5 cycles or 10 cycles of formation leaching, where a single cycle indicates injection and production of approximately one pore volume of water. It is understood that there may be numerous water injection and water production wells in an actual oil shale development. Moreover, the system may include monitoring wells (28 & 29) which can be utilized during the oil shale heating phase, the shale oil production phase, the leaching phase, or during any combination of these phases to monitor for migratory contaminant species and/or water-soluble minerals.

Alternatively, physical barriers can be placed around the heated zone. These barriers may involve freeze walls or grout walls. Freeze walls involve circulating refrigerant through peripheral wells to freeze native water in the vicinity. Shell has discussed freeze walls for oil shale production in a number of patents, including U.S. Pat. No. 6,880,633. The entire disclosure of which is incorporated herein by reference. Grout walls involve injecting cement into the formation to fill permeable pathways.

As discussed herein, some embodiments of the invention include an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the invention the natural resources may include hydrocarbon fluids, including, for example products of the pyrolysis of formation hydrocarbons such as shale oil. In some embodiments of the invention the natural resources may also include water-soluble minerals, including, for example, nahcolite (sodium bicarbonate), soda ash (sodium carbonate) and dawsonite ($NaAl(CO_3)(OH)_2$).

Some embodiments of the invention include in situ heating an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral means the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

In some embodiments of the invention heating of the organic-rich rock formation pyrolyzes at least a portion of the formation hydrocarbons to create hydrocarbon fluids. The formation hydrocarbons may be pyrolyzed in situ by raising the organic-rich rock formation, or zones within the formation, to a pyrolyzation temperature. In alternative embodiments, the heating rate of the formation may be slowly raised through the pyrolysis temperature range. For example, an in situ conversion process for formation hydrocarbons may include heating at least a portion of an organic-rich rock formation to raise the average temperature of the zone above about 270° C. by a rate less than a selected amount (e.g., about 10° C., 5° C., 3° C., 1° C., 0.5° C., or 0.1° C.) per day. In a further embodiment the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation occurs in a reasonable, e.g., days, weeks or months, period of time). The pyrolysis temperature range may vary depending on the types of formation hydrocarbons within the formation, the heating methodology, and distribution of heating sources. For example, a pyrolysis temperature range may include temperatures between about 250° C. and about 900° C. In an alternative embodiment, a pyrolysis temperature range may include temperatures between about 270° C. to about 400° C.

In some embodiments, the hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as major components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

In some embodiments of the invention heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbon, may be liberated from the formation itself upon heating, or may be made accessible through the creation of increased permeability upon heating of the formation. The migratory contaminant species may be soluble in water or aqueous fluids present in or injected into the organic-rich rock formation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

In some embodiments, at least a portion of the migratory contaminant species remain in the organic-rich rock formation after the hydrocarbon fluids are produced. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution.

Some embodiments include processing the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In one embodiment, the migratory contaminant species include one or more of aromatic hydrocarbons, polyaromatic hydrocarbons, oxygenated hydrocarbons, metal contaminants, and ionic contaminants. In an alternative embodiment, the migratory contaminant species include one or more of benzene, toluene, xylene, ethylbenzene, tri-methylbenzene, and polyaromatic hydrocarbon species. In an alternative embodiment, the migratory contaminant species include one or more of metal contaminants containing arsenic, boron, chromium, mercury, selenium, lead, vanadium, nickel, cobalt, molybdenum and zinc.

Some embodiments of the invention include assessing the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

In certain embodiments a mass of at least a portion of the formation may be reduced due, for example, to pyrolysis of formation hydrocarbons and the production of hydrocarbon fluids from the formation. As such, the permeability and porosity of at least a portion of the formation may increase. In addition, removing water during the heating may also increase the permeability and porosity of at least a portion of the formation.

Certain embodiments may include increasing the permeability of at least a portion of an organic-rich rock formation to greater than about 0.01, 0.1, 1, 10, 20 and/or 50 Darcy. In addition, certain embodiments may include substantially uniformly increasing the permeability of at least a portion of an organic-rich rock formation. Some embodiments may include increasing the porosity of at least a portion of an organic-rich rock formation substantially uniformly.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

In an embodiment, heating a portion of an organic-rich rock formation in situ to a temperature less than an upper pyrolysis temperature may increase permeability of the heated portion. For example, permeability may increase due to formation of fractures within the heated portion caused by application of heat. As the temperature of the heated portion increases, water may be removed due to vaporization. The vaporized water may escape and/or be removed from the formation. Removal of water may also increase the permeability of the heated portion. In addition, permeability of the heated portion may also increase as a result of production of hydrocarbon fluids from pyrolysis of at least some of the formation hydrocarbons within the heated portion on a macroscopic scale. In an embodiment, the permeability of a selected zone within a heated portion of an organic-rich rock formation may be substantially uniform. For example, heating by conduction may be substantially uniform, and thus a permeability created by conductive heating may also be substantially uniform.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase a permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In some embodiments, heating the organic-rich formation includes generating soda ash by decomposition of nahcolite. In some embodiments the method may include processing an aqueous solution containing water-soluble minerals in a surface facility to remove a portion of the water-soluble minerals. The processing step may include removing the water-soluble minerals by precipitation caused by altering the temperature of the aqueous solution. In some embodiments, the water-soluble minerals include sodium. Alternatively, the water-soluble minerals may include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation after a portion of the water-soluble minerals and/or migratory contaminant species are removed and then the solution may be sequestered in the subsurface formation. The subsurface formation may be the same as or different from the organic-rich rock formation.

In some embodiments, heating the organic-rich rock formation includes generating soda ash by decomposition of nahcolite present in the formation. In the decomposition process $CO_2$ is generated. Some embodiments include monitoring for the presence of the formed $CO_2$ and, alternatively, estimating the extent of the heating of the organic-rich rock formation from the $CO_2$ monitoring. The estimated extent may include estimating the distribution of heating in the formation, estimating the overall volume which has reached a given temperature, or estimating the rate of progression of a heat front in the formation. Estimations may be calculated based on (i) measured or estimated stoichiometries, decomposition thermodynamics and/or kinetics of nahcolite, kerogen, and/or other carbonate minerals and (ii) measured or estimated distributions of nahcolite kerogen and/or other carbonates in the formation. Additionally, heat transfer models and/or simulations may be employed based on the heat input rates to the formation and assumed heat transfer characteristics of the formation and then the models and/or simulations refined based on the measured $CO_2$ data and calculations. Alternatively, the $CO_2$ monitoring data may be correlated to the extent of heating through use of a computer model based on nahcolite conversion to soda ash. The amount of the $CO_2$ formed may be tracked in a nahcolite conversion process to determine the extent to which soda ash is present. The estimates of the extent of heating based on $CO_2$ data and calculations may be used to refine heat transfer models of the organic-rich rock formation and/or simulations of the generation and production of hydrocarbon fluids from the organic-rich rock formation. The heating estimates may be used to adjust the rate at which heat is input into the organic-rich rock formation at one or more locations or production fluids are produced from the formation. The heating of the organic-rich rock formation may be accomplished through use of heater wells. The heater wells may include, for example, electrical resistance heating elements. The production of hydrocarbon fluids from the formation may be accomplished through use of production wells. The adjustment of the rate at which heat is input into the organic-rich rock formation or adjusting the rate at which production fluids are produced from the formation may be accomplished through one or more of adjusting the heat input to a heater well, adjusting the flow rate from a production well, adjusting the back pressure of a production well, or combinations thereof.

There may be several different types of wells used in embodiments of the invention. For example, the heating of the organic-rich rock formation may be accomplished through use of heater wells. The heater wells may include, for example, electrical resistance heating elements. The production of hydrocarbon fluids from the formation may be accomplished through use of production wells. The injecting of the aqueous fluid may be accomplished through use of injection wells. The production of the aqueous solution may be accomplished through use of solution production wells. The different types of wells may be used for multiple purposes. For example, the production wells may also be used as injection wells for injecting water into the organic-rich rock formation. Alternatively, the production wells may also be used as solution production wells for producing the aqueous solution from the organic-rich rock formation. This method may be combined with any of the other aspects of the invention as discussed herein.

In one embodiment, the method includes an in situ method of recovering natural resources including heating an organic-rich rock formation in situ. The formation may be substantially impermeable to fluid flow initially, contain formation hydrocarbons, and water-soluble minerals. In some embodiments the heating occurs prior to substantial removal of the formation water-soluble minerals. The heating pyrolyzes at least a portion of the formation hydrocarbons to create hydrocarbon fluids and thereby create permeability within a matured (pyrolyzed) organic-rich rock zone in of the organic-rich rock formation. The hydrocarbon fluids may be produced from the formation. The method may include leaving a second portion of the formation hydrocarbons substantially unpyrolyzed, thereby preserving an unmatured organic-rich rock zone. In some embodiments, the unmatured organic-rich rock zones may be shaped as pillars running substantially the entire thickness of the organic-rich rock formation. The heating rate and distribution of heating of the formation may be designed and implemented to leave sufficient unmatured pillars to prevent subsidence. Further, the method may include converting at least a portion of the formation water-soluble minerals to a different water-soluble mineral. For example, naturally occurring nahcolite may be decomposed to soda ash through heating. This method may be combined with any of the other aspects of the invention as discussed herein.

The method may include flushing the matured organic-rich rock zone and the unmatured organic-rich rock zone with an aqueous fluid. The aqueous fluid may be used to dissolve water-soluble minerals and migratory contaminant species as discussed herein. The flushing may optionally be completed after a substantial portion of the hydrocarbon fluids have been produced from the matured organic-rich rock zone. The resulting aqueous solution may then be produced from the organic-rich rock formation to the surface for processing as discussed herein. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein.

One embodiment may include an in situ method of recovering natural resources including heating the organic-rich rock formation in situ, where the formation contains formation water-soluble minerals. The heating may occur prior to substantial removal of the water-soluble minerals. The heating may both pyrolyze at least a portion of the formation hydrocarbons to create hydrocarbon fluids and generate water which migrates and at least partially dissolves the formation water-soluble minerals in situ to form an aqueous fluid within the formation. The generated water may be produced from one or more occurrences. For example, the generated water may be produced by decomposition of formation water-soluble minerals, pyrolyzation of formation hydrocarbons, dehydration of formation clays, or combinations thereof. This method may be combined with any of the other aspects of the invention as discussed herein.

Some embodiments further include producing a production fluid from the organic-rich rock formation where the production fluid contains the hydrocarbon fluids and the aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

One embodiment includes an in situ method of recovering natural resources, including assessing the market price for a water-soluble mineral and comparing the market price for the water-soluble mineral to a cost-to-produce criterion. For example, the method may utilize a market price that is representative of the current market price, the forecasted market price, or a combination thereof. There are many potential market prices that may be used in the method. For example, the market price may be a listed commodity price, the price used in an existing or potential contractual arrangement or another measure of the current or potential value of the water-soluble mineral or a commodity or consumer product containing the water-soluble mineral or derivatives thereof. The water-soluble mineral may be a sodium mineral, including, for example, nahcolite or soda ash. The cost-to-produce criterion may be any criterion that reflects a measurement of the cost to produce the water-soluble mineral of interest or derivatives thereof. For example, the cost-to-produce criterion may include the cost to solution mine the water-soluble mineral of interest. The cost-to-produce criterion may include a measure of the cost to produce the water-soluble mineral before heating the organic-rich rock formation to pyrolyze formation hydrocarbons as compared to the cost to produce the water-soluble mineral after heating the organic-rich rock formation to pyrolyze formation hydrocarbons. The method may include determining that the market price of the water-soluble-mineral is less than the cost-to-produce criterion. In such case, an operator may opt to forego producing the water-soluble minerals before pyrolyzing the formation hydrocarbons in the organic-rich rock formation, thus delaying production of the water-soluble minerals to a later time. The resulting multi-mineral production scheme may be more economic than producing the water-soluble minerals before pyrolyzation. This embodiment may be combined with other embodiments and aspects of the invention discussed herein.

An embodiment may include an in situ method of recovering natural resources, including providing produced fluid processing facilities which are sized to process a first hydrocarbon fluid production rate produced during an initial production period together with a first $CO_2$ production rate produced during the initial production period. The first $CO_2$ production rate may include $CO_2$ generated from dissociation of nahcolite to form soda ash. Thus the method may be used to adequately size produced fluid processing facilities where the operator plans to pyrolyze formation hydrocarbons without removing the naturally occurring nahcolite before pyrolyzation. The method may enable one to economically produce hydrocarbon fluids from an organic-rich rock formation without the necessity of removing the nahcolite beforehand, thus improving the overall project economics. This embodiment may also be practiced by designing and/or constructing a system that includes the produced fluid processing facilities. This method may be combined with any of the other aspects of the invention as discussed herein.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment typically involves packed or multi-tray countercurrent towers. Optimal sizing for each of these aspects is highly dependent on the rate at which gas is being produced from the formation and the concentration of the acid gases in the gas stream. Less commonly, cryogenic distillation is utilized to remove acid gases. This method takes advantage of the differences in the boiling points of the gas components.

In different embodiments, the initial production period may include a one year period beginning from the point of the first heating of the organic-rich rock formation. Alternatively, the initial production period may include a two, three, four or a five year period beginning from the point of the first heating of the organic-rich rock formation. In different embodiments, the first hydrocarbon fluid production rate may be the maximum daily hydrocarbon fluid production rate reached during the initial production period. Alternatively, the first hydrocarbon fluid production rate may be the maximum hourly, monthly or yearly hydrocarbon fluid production rate reached during the initial production period. In different embodiments, the first $CO_2$ production rate may be the maximum daily $CO_2$ production rate reached during the initial production period. Alternatively, the first $CO_2$ production rate may be the maximum hourly, monthly or yearly $CO_2$ production rate reached during the initial production period. This embodiment may be combined with other aspects of the invention discussed herein.

It can be seen that the current invention proposes to recover the value of the water-soluble minerals such as nahcolite after heating an oil shale zone and producing at least some of the shale oil. There may be a one or more benefits to this approach, including:

(1) The shale oil can be significantly more valuable than the water-soluble mineral components. Thus, recovering the shale oil value earlier can improve the net present value of the development of a lease under development.

(2) Removing water-soluble minerals early in the process may disrupt the ability to produce the oil shale by certain methods. For instance, removal of the soluble minerals can hinder the ability to produce hydraulic fractures in the formation and make the shale more prone to cavern formation and subsidence. Subsidence can cause substantial stresses on the wellbore completions and lead to early and sudden failures.

(3) Solution mining after kerogen conversion can be combined with leaching of migratory contaminant species, including, for example, water-soluble organic components, heavy metal components and ionic species left over from producing the oil shale. The removal of such components may be environmentally necessary if the shale oil zone is connected to a ground water source. The alkali nature of sodium carbonate solutions can aid the washing of organics from the shale oil zone.

(4) Project and field coordination can be simplified by separating the oil shale and mineral removal activities. Moreover, certain wells and facilities can be reused from the in situ shale oil development for the mineral removal.

(5) The conversion of nahcolite to soda ash, with resultant $CO_2$ generation, during the oil shale heating can be used to monitor the progression of the oil shale maturation. As the nahcolite converts to soda ash, the production of generated $CO_2$ can be analyzed to help assess the position of the heat front and the nature of the generated permeability. At lower temperatures (<~250° C.), the $CO_2$ generation in certain areas will be dominated by nahcolite decomposition. The heating behavior of oil shale can be correlated to the amount of $CO_2$ present in the produced fluid return stream based on estimates of the amount of nahcolite present in situ. At higher temperatures, $CO_2$ concentrations may more greatly reflect generation from the kerogen converting to oil and gas and perhaps from dawsonite decomposition. At even higher temperatures (>~400° C.), the $CO_2$ generation also reflects other carbonate mineral dissociation. Analyzing the isotopic nature of the $CO_2$ (typically via mass spectrography) can be used to distinguish between $CO_2$ gas from organic and inorganic sources. Organic-sourced gas tends to be lighter (i.e., enriched in $^{12}C$ vs. $^{13}C$) than inorganic-sourced gas. (See, for example, Laughrey, C. D. and Balassare, F. J., "Some Applications of Isotope Geochemistry for Determining Sources of Stray Carbon Dioxide Gas", Environmental Geosciences, 10(3), pp. 107-122, (2003)). The entire disclosure of which is incorporated herein by reference. $CO_2$ concentrations can be measured in a number of ways known in the art including gas chromatography, mass spectrography, infrared spectrography, Raman spectrography, photoacoustic spectrography, gas density measurements, and various chemical-specific reactions. Isotopic concentrations are typically measured via a combination of mass spectrography and gas chromatography.

(6) Extracting the water-soluble minerals after the oil shale maturation may increase their recovery since the maturation process increases permeability and connectivity in the formation. Thus, originally isolated concentrations of soluble minerals may become accessible to the injected water.

(7) The sodium minerals are produced as soda ash, rather than sodium bicarbonate. Produced nahcolite is often converted to soda ash in a facility and thus a step is saved with the in situ conversion.

(8) In addition to the benefits described above, if in situ conversion of the oil shale necessitates a ground water cleanup by intentional leaching, there may be additional synergies between cleanup operations and facilities and mineral solution mining operations and facilities.

The above-described processes may be of merit in connection with the recovery of hydrocarbons and nahcolite in the Piceance Basin of Colorado. Some have estimated that in some oil shale of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Pitman, J. K., Pierce, F. W. and Grundy, W. D., "Thickness, Oil-Yield and Kriged Resource Estimates for the Eocene Green River Formation, Piceance Creek Basin, Colorado, United States Geological Survey Oil and Gas Investigations Chart OC-132, 6 sheets (1989)). The entire disclosure of which is incorporated herein by reference.

Dyni estimates the total nahcolite resource in the Piceance Basin at 32 billion short tons. This makes it the second largest sodium carbonate deposit in the world behind the trona deposits of southwest Wyoming (103 billion short tons). Resource density in the basin center areas varies from 170-490 million short tons per square mile.

As noted, it is preferred that thermal recovery of oil and gas be conducted before solution mining of nahcolite or other water-soluble minerals. In addition to the reasons discussed above, it is noted that solution mining can generate large voids in a rock formation and collapse breccias in an oil shale development unit. These voids and brecciated zones may pose problems for in situ and mining recovery of oil shale.

Also, when solution mining occurs first (as others have proposed), it becomes necessary to remove large amounts of water prior to oil shale heating. There are also inefficiencies associated with heating void filling water or gas.

In addition, heated fracture methods of in situ conversion of oil shale may not be possible within solution-mined areas. These recovery processes may require the construction of hydraulic fractures and the placement of a suitable proppant within those fractures. Voids and breccia may permit too much leak-off of fracture fluids, making pressure maintenance (required to form the fracture) and proppant placement difficult or impossible. In the virgin oil shale where nahcolite is present, the formation is tight and can maintain high pressure with minimal bleed off. Solution mining will probably change the fracturing behavior of the formation dramatically. At the least, solution mining may create the development of unpredictable fluid pathways resulting in lost production in the subsurface.

Finally, it is noted that, if heated to high enough temperature, sodium carbonate may further decompose into sodium oxide and $CO_2$, according to the following reaction.

$$Na_2CO_3 \rightarrow Na_2O + CO_2$$

One may track the amount of $CO_2$ generated in a nahcolite conversion process to determine the extent to which soda ash might be present or even sodium oxide. This is based upon a previously developed model which estimates the amount of nahcolite originally within the rock formation.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. An in situ method of recovering natural resources, comprising:
    (a) heating an organic-rich rock formation in situ,
        the organic-rich rock formation (i) being substantially impermeable to fluid flow initially, (ii) containing formation hydrocarbons, and (iii) containing one or more formation water-soluble minerals, the heating (i) pyrolyzing at least a portion of the formation hydrocarbons in a matured organic-rich rock zone of the organic-rich rock formation to create hydrocarbon fluids, thereby creating permeability within the matured organic-rich rock zone, (ii) leaving a second portion of the formation hydrocarbons substantially unpyrolyzed, thereby preserving an unmatured organic-rich rock zone, and (iii) converting at least a portion of the one or more formation water-soluble minerals to one or more first water-soluble minerals;
    (b) producing the hydrocarbon fluids from the matured organic-rich rock zone;
    (c) flushing the matured organic-rich rock zone and the unmatured organic-rich rock zone with an aqueous fluid after a substantial portion of the hydrocarbon fluids have been produced from the matured organic-rich rock zone, thereby dissolving the one or more first water-soluble minerals in the aqueous fluid to form a first aqueous solution; and
    (d) producing the first aqueous solution to the surface.

2. The method of claim 1, wherein the formation hydrocarbons include solid hydrocarbons.

3. The method of claim 2, wherein the organic-rich rock formation is an oil shale formation.

4. The method of claim 1, wherein the formation hydrocarbons include heavy hydrocarbons.

5. The method of claim 3, wherein the organic-rich rock formation has an initial total permeability less than 1 millidarcy before the heating step (a).

6. The method of claim 3, wherein the one or more formation water-soluble minerals include sodium.

7. The method of claim 6, wherein the one or more formation water-soluble minerals comprise nahcolite (sodium bicarbonate), dawsonite ($NaAl(CO_3)(OH)_2$), or combinations thereof.

8. The method of claim 7, wherein the one or more first water-soluble minerals comprise soda ash (sodium carbonate).

9. The method of claim 3, wherein the heating step (a) results in at least a portion of the organic-rich rock formation reaching a temperature of 270° C. or greater.

10. The method of claim 3, further comprising:
    (e) processing the first aqueous solution in a surface facility to remove a portion of the one or more first water-soluble minerals.

11. The method of claim 10, wherein the processing step (e) includes removing the one or more first water-soluble minerals by precipitation caused by altering the temperature of the first aqueous solution.

12. The method of claim 8, wherein the heating step (a) includes converting at least a portion of the nahcolite to soda ash.

13. The method of claim 12, wherein the heating step (a) further includes forming $CO_2$ during the converting at least a portion of the nahcolite to soda ash, and the method further comprises:
    (e) monitoring for the presence of the formed $CO_2$.

14. The method of claim 13, further comprising:
    (f) estimating the extent of the heating of the organic-rich rock formation from the $CO_2$ monitoring.

15. The method of claim 3, wherein the heating step (a) is accomplished through use of heater wells, the producing step (b) is accomplished through use of production wells, the flushing step (c) is accomplished through use of injection wells, the producing step (d) is accomplished through use of solution production wells, and the production wells are also used as injection wells for injecting the aqueous fluid into the organic-rich rock formation in step (c).

16. The method of claim 3, wherein the heating step (a) is accomplished through use of heater wells, the producing step (b) is accomplished through use of production wells, the flushing step (c) is accomplished through use of injection wells, the producing step (d) is accomplished through use of solution production wells, and the production wells are also used as solution production wells for producing the first aqueous solution to the surface in step (d).

17. The method of claim 3, wherein the heating step (a) is accomplished through introducing heat into heater wells penetrating at least partially through the organic-rich rock formation.

18. The method of claim 17, wherein the heater wells include electrical resistance heating elements.

19. The method of claim 3, wherein the heating step (a) makes available one or more migratory contaminant species previously bound in the organic-rich rock formation, the method further comprising:
    (e) processing the first aqueous solution in the surface facility to remove at least some of the one or more migratory contaminant species.

20. The method of claim 19, wherein the one or more migratory contaminant species include one or more of aromatic hydrocarbons, polyaromatic hydrocarbons, oxygenated hydrocarbons, metal contaminants, and ionic contaminants.

21. The method of claim 20, wherein the one or more migratory contaminant species include one or more of benzene, toluene, xylene, ethylbenzene, trimethylbenzene, and polyaromatic hydrocarbons.

22. The method of claim 20, wherein the one or more migratory contaminant species include one or more of metal contaminants containing arsenic, boron, chromium, mercury, selenium, lead, vanadium, nickel, cobalt, molybdenum and zinc.

23. The method of claim 3, wherein the unmatured organic-rich rock zones are shaped as pillars running substantially the entire thickness of the organic-rich rock formation.

24. The method of claim 3, wherein the flushing step (c) is delayed after the producing step (b) to (1) allow heat generated from the heating step (a) to migrate deeper into surrounding unmatured organic-rich rock zones to convert nahcolite within the surrounding unmatured organic-rich rock zones to soda ash, (2) generate permeability within the surrounding unmatured organic-rich rock zones, or (3) both.

25. The method of claim 3, wherein the flushing step (c) and subsequent recovery of one or more first water-soluble minerals is delayed based on current and/or forecast market prices of sodium bicarbonate, soda ash, or both.

26. The method of claim 3, wherein the heating step (a) is initiated prior to substantial removal of the one or more formation water-soluble minerals from the organic-rich rock formation.

27. The method of claim 3, wherein the heating step (a) is initiated prior to removal of greater than 7 weight percent of the initially present one or more formation water-soluble minerals from the organic-rich rock formation.

28. The method of claim 3, wherein the heating step (a) is substantially completed prior to substantial removal of the one or more formation water-soluble minerals from the organic-rich rock formation.

29. The method of claim 3, wherein the heating step (a) is substantially completed prior to removal of greater than 7 weight percent of the initially present one or more formation water-soluble minerals from the organic-rich rock formation.

* * * * *